(12) United States Patent
Gao et al.

(10) Patent No.: US 11,526,750 B2
(45) Date of Patent: Dec. 13, 2022

(54) AUTOMATED INDUSTRY CLASSIFICATION WITH DEEP LEARNING

(71) Applicant: ZoomInfo Apollo LLC, Vancouver, WA (US)

(72) Inventors: Hua Gao, Sunnyvale, CA (US); Amit Rai, Danville, CA (US); Yi Jin, Redwood City, CA (US); Rakesh Gowda, San Mateo, CA (US); Joseph James Kardwell, San Mateo, CA (US)

(73) Assignee: ZOOMINFO APOLLO LLC, Vancouver, WA (US)

( * ) Notice: Subject to any disclaimer, the term of this patent is extended or adjusted under 35 U.S.C. 154(b) by 537 days.

(21) Appl. No.: 16/666,927

(22) Filed: Oct. 29, 2019

(65) Prior Publication Data

US 2020/0143241 A1    May 7, 2020

Related U.S. Application Data

(60) Provisional application No. 62/752,209, filed on Oct. 29, 2018.

(51) Int. Cl.
*G06N 3/08* (2006.01)
*G06K 9/62* (2022.01)

(52) U.S. Cl.
CPC ............... *G06N 3/08* (2013.01); *G06K 9/628* (2013.01); *G06K 9/6256* (2013.01)

(58) Field of Classification Search
None
See application file for complete search history.

(56) References Cited

U.S. PATENT DOCUMENTS

| | | |
|---|---|---|
| 7,043,531 B1 | 5/2006 | Seibel et al. |
| 9,202,227 B2 | 12/2015 | Kahlow |
| 2006/0129975 A1 | 6/2006 | Wille et al. |

(Continued)

OTHER PUBLICATIONS

Sam Wood et al. "Automated Industry Classification with Deep Learning" IEEE 2017. (Year: 2017).*

(Continued)

*Primary Examiner* — Leon Flores
(74) *Attorney, Agent, or Firm* — Summit Patents PC

(57) ABSTRACT

An automated predictive analytics system disclosed herein provides a novel technique for industry classification. Leveraging specific API to construct a database of companies labeled with the industries to which they belong, the automated predictive analytics system trains a deep neural network to predict the industries of novel companies. The automated predictive analytics system examines the capacity of the model to predict six-digit NAICS codes, as well as the ability of the model architecture to adapt to other industry segmentation schemas. Additionally, the automated predictive analytics system investigates the ability of the model to generalize despite the presence of noise in the labels in the training set. Finally, the automated predictive analytics system explores the possibility of increasing predictive precision by thresholding based on the confidence scores that the model outputs along with its predictions. The automated predictive analytics system finds that the approach yields six-digit NAICS code predictions that surpass the precision of gold-standard databases.

19 Claims, 10 Drawing Sheets

(56) References Cited

U.S. PATENT DOCUMENTS

| | | |
|---|---|---|
| 2007/0299743 A1 | 12/2007 | Staib et al. |
| 2008/0086343 A1 | 4/2008 | Pendergraft et al. |
| 2008/0086363 A1 | 4/2008 | Kass et al. |
| 2008/0288889 A1 | 11/2008 | Hunt et al. |
| 2010/0262550 A1 | 10/2010 | Burritt et al. |
| 2011/0213655 A1 | 9/2011 | Henkin et al. |
| 2012/0089497 A1 | 4/2012 | Taylor et al. |
| 2012/0137367 A1 | 5/2012 | Dupont et al. |
| 2012/0203584 A1 | 8/2012 | Mishor et al. |
| 2013/0031018 A1 | 1/2013 | Jellum |
| 2015/0046219 A1 | 2/2015 | Shavlik |
| 2015/0379602 A1 | 12/2015 | Gupta et al. |
| 2016/0048854 A1 | 2/2016 | Kahlow |

OTHER PUBLICATIONS

Feature-Based recommendations for one-to-one marketing. Sung-Shun Weng. Mei-Ju Liu Expert Systems with Applications, vol. 26, Issue 4. May 2004. (Year: 2004).

* cited by examiner

500

AUTOMATED INDUSTRY CLASSIFICATION WITH DEEP LEARNING

CROSS-REFERENCE TO RELATED APPLICATIONS

This patent application is a non-provisional patent application based on U.S. provisional patent application Ser. No. 62/752,209 filed on 29 Oct. 2018, which is incorporated by reference herein.

FIELD

Implementations disclosed herein relate, in general, to information management technology and specifically to predictive analytics technology.

BACKGROUND

Determining the industry to which a company belongs is a difficult problem with important applications. Sales and marketing teams hoping to generate prospective leads, insurers seeking new clients, and corporations that need to identify their rivals all need a way to discriminate between companies that do and do not belong to the industries in which they are interested. Moreover, investment banks and venture capital firms benefit greatly from an understanding of the distribution of companies among different industries.

The preeminent taxonomy for industry classification is the North American Industry Classification System (NAICS), which is the standard used by, among other organizations, the United States Census Bureau. The 2017 NAICS taxonomy arrays the North American business economy into 1057 industries, each corresponding to a six-digit code. Each industry belongs to an industry group, represented by the first four digits of the code, which in turn belongs to a subsector, represented by the first three digits, which in turn belongs to a sector, represented by the first two digits. In addition to the 1057 industries, NAICS comprises 20 sectors, 99 subsectors, and 311 industry groups.

For a publicly traded company, the industry to which the company belongs is public information. For private companies, on the other hand, it is far more difficult to determine the industry to which an organization belongs. Several databases, including SICCODE and Dun & Bradstreet, provide NAICS codes for private corporations. However, in classifying companies into NAICS industries, these databases rely on self-reporting, manual entry, and possibly naive algorithms. As a result, these databases are slow to adapt to the changing landscape of the business economy, and, for especially difficult NAICS codes, the precision of their classifications can be quite low.

SUMMARY

An automated predictive analytics system disclosed herein provides a novel technique for industry classification. Leveraging specific API to construct a database of companies labeled with the industries to which they belong, the automated predictive analytics system trains a deep neural network to predict the industries of novel companies. The automated predictive analytics system examines the capacity of the model to predict six-digit NAICS codes, as well as the ability of the model architecture to adapt to other industry segmentation schemas. Additionally, the automated predictive analytics system investigates the ability of the model to generalize despite the presence of noise in the labels in the training set. Finally, the automated predictive analytics system explores the possibility of increasing predictive precision by thresholding based on the confidence scores that the model outputs along with its predictions. The automated predictive analytics system finds that this approach yields six-digit NAICS code predictions that surpass the precision of gold-standard databases.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Figure 1:
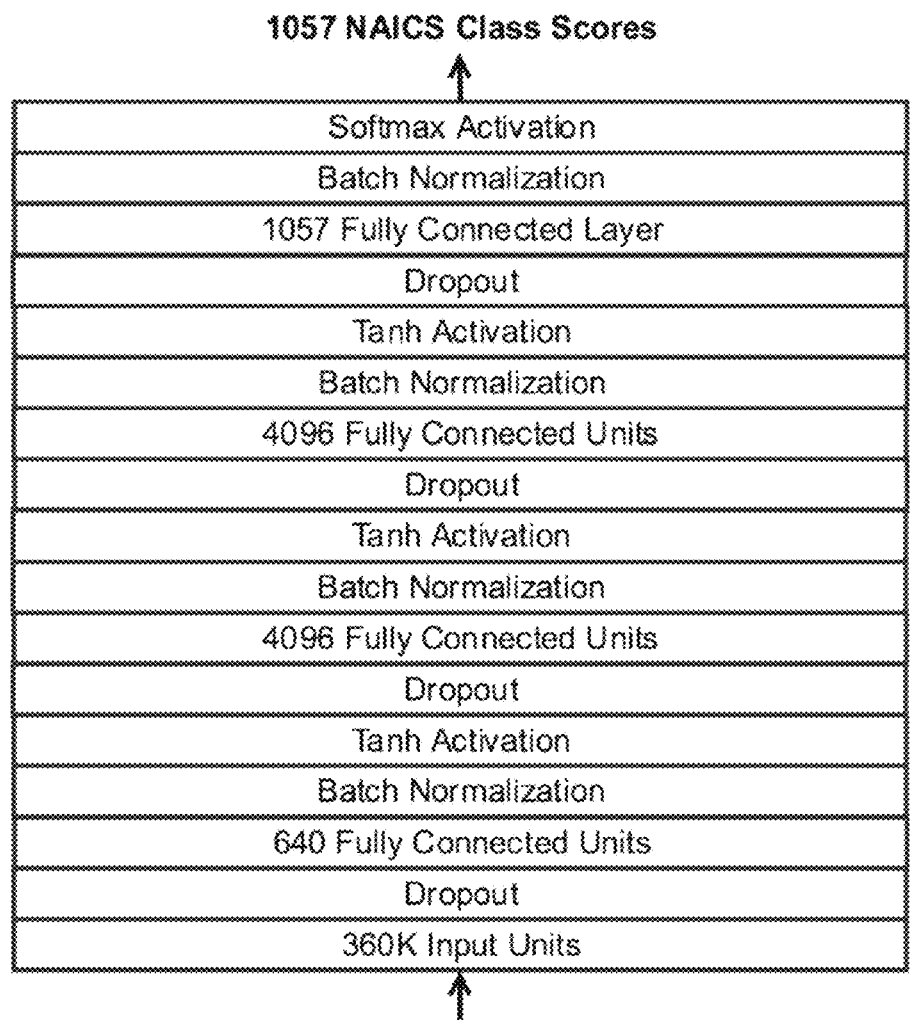
FIG. 1 illustrates an example of the multilayer perceptron architecture neural network architecture used by the technology disclosed herein.

Disclosed herein is a novel approach to industry classification, utilizing a multilayer perceptron. Because the classifier relies on machine learning and automated data acquisition rather than on manual labor, the approach provides a highly efficient solution for the classification of companies that are not already contained within an extant database. Moreover, by thresholding the predictions of the classifier based on confidence scores, the automated predictive analytics system is able to classify corporations into six-digit NAICS industries with greater precision than that of the classifications provided by premier databases. Finally, the framework of the model can be used to label companies according to any industry classification schema, not only NAICS. As a result, the algorithm can rapidly adapt to changing industries in a way that classification systems tied to the static NAICS taxonomy cannot.

I DATASET CONSTRUCTION

A. Database

As the automated predictive analytics system constructs the training set, it makes use of a proprietary database with an index of over 18 million companies tying each entity to a detailed set of attributes. The massive size of the database, which is compiled by combining data purchased from private vendors with data extracted from the internet by specific internally developed web-crawling technologies, calls for storage on a distributed file system, such as HDFS (Hadoop Distributed File System), and parallel processing with frameworks such as Apache Spark. However, a machine-learning approach to training an industry classifier requires that the automated predictive analytics system performs repeated computations over the training set on a GPU, which does not have the requisite cache memory capacity to store the database.

The automated predictive analytics system disclosed herein approaches this obstacle by representing the companies in the dataset with sparse feature vectors, which is extracted from the database. By representing the final features using sparse vectors, the automated predictive analytics system is able to store the entire training set on a single machine. Then, by training the classifier on minibatches of data, the automated predictive analytics system is able to process the whole dataset using the parallelized algebraic computing capabilities offered by a GPU: Taking only around 1000 examples from the training set at a time, the automated predictive analytics system loads the sparse feature vectors for these examples into a dense matrix and feed this minibatch of training data to the GPU.

B. Feature Extraction

Of all the corporate attributes stored in the database, the most salient features for industry classification are the natural language descriptions of the companies as well as textual data extracted from the company websites. The language used to describe companies can be used to uniquely associate those companies with particular industries in a way that features like location, number of employees, and revenue cannot. Moreover, text descriptions are a natural candidate for sparse feature representation. The automated predictive analytics system represents a description by a weighted combination of the most relevant keywords it contains, allowing the system to store each description as a sparse vector containing weights only for the keywords that are in the description.

In order to extract relevant keywords from a description, the automated predictive analytics system first performs a series of preprocessing steps. For each company, the automated predictive analytics system extracts the text data on relevant webpages, from the title, meta description, meta keywords, hyperlinks, and visible text. Because webpage texts may sometimes be repeated across pages, e.g. navigation links or other boilerplate text, the automated predictive analytics system counts and limit the consideration of distinct lines of webpage text to a maximum of 3 occurrences per company. Other data sources providing already paragraph-like text descriptions of companies can be directly used, e.g. Wikipedia articles and company descriptions from third-party vendors.

The automated predictive analytics system prepares a vocabulary of keywords and keyword phrases that are relevant in describing the services and product offerings of businesses. Afterwards, the automated predictive analytics system performs bag-of-words analysis on the n-grams of each piece of text, so that the text is represented by the number of times that each one-, two-, three-, and four-word keyword phrase appears. Next, the automated predictive analytics system uses a term frequency-inverse document frequency (tf-idf) weighting scheme, so that the n-grams are weighted not by the raw frequency with which they occur in the document, but by the ratio of the frequency they occur in the document to the ratio of the frequency they occur in the corpus of companies. In this setup, all pieces of text related to a company are aggregated together such that each company is considered a document.

The automated predictive analytics system utilize three categories of sparse features. The first category is the tf-idf value of n-grams from the pooled set of texts across all sources for each company. The second category is the tf-idf value for n-grams in the companies' homepage title, meta description, and meta keywords. Finally, the third category is the tf-idf value for n-grams in the companies' home-page hyperlinks. Within each category, the tf-idf values are scaled such that the maximum value is 1.0. Conceptually, the first category represents a holistic view of all text associated with the company. The second category tracks the self-reported descriptions and title text, which tend to be concise and more reliable than third-party descriptions. The third category tracks hyperlink texts which tend to summarize products and services at a topical level that is in between the granularity found in the overviews or descriptions and the specific terminology used in the focused overviews of each product or service.

C. Training Set Labels

In order to generate training labels for the companies in the dataset, the automated predictive analytics system relies on a database that assigns six-digit NAICS codes to companies. In one implementation, this database may be purchased from an industry-standard data vendor. While the database does not contain six-digit NAICS codes for every company in the dataset, it does contain codes for nearly one in four companies, leaving us with a training set of around 4 million companies, represented as sparse feature vectors labeled with NAICS codes provided by the data vendor.

Labeled examples that have fewer than 15 nonzero feature values are removed from training since they are often dead or inactive companies, or international companies whose associated text is in a foreign language not covered by the vocabulary. NAICS codes that occur fewer than 10 times are also removed. To prune the feature space, the automated predictive analytics system computes the sum of values for each feature within the labeled examples and keep the top 360,000 features.

Due to a combination of ambiguity in the NAICS taxonomy, human error, and the naivety of the algorithms that traditional data vendors use for automatic industry classification, the labels in the training set are highly noisy, posing serious problems for the training scheme. Using Human Intelligence Tasks (HIT) system, which enables assignment and tracking of manual tasks such as data verification to human workers via a web-based platform, the automated predictive analytics system found that the accuracy of the NAICS classifications in the purchased database can drop as low as 30% for particularly ambiguous or nuanced NAICS codes. Our attempts to handle the noise in the labels for the training set are explained in Section II-B.

II MODEL IMPLEMENTATION

A. Neural Network Architecture

Our model utilizes a multilayer perceptron architecture 100, shown in FIG. 1. Specifically, the automated predictive analytics system uses a neural network with four fully-connected layers. After each of the first three layers the automated predictive analytics system performs batch normalization, tan h activation, and dropout with a keep probability of 0.5. After the final fully-connected layer, the automated predictive analytics system performs batch normalization and soft-max activation. Our first fully-connected layer has a hidden dimension of 640; the second and third layers have a hidden dimension of 4096; and the output dimension of the final layer is the number of industries into which the automated predictive analytics system is classifying: In the case where the automated predictive analytics system is classifying according to six-digit NAICS codes, the output dimension of this layer is 1057. The dimension of each training example that the automated predictive analytics system inputs*to the neual network, which corresponds to the number of keywords in the dense matrix that w the automated predictive analytics system loads from the sparse feature vectors in a minibatch, is on the order of 360,000. As a result, for six-digit NAICS classification, the model uses around 250 million parameters (360000 640+640 4096+ 4096 4096+4096 1057).

In several experiments, the automated predictive analytics system tests other activation functions such as ReLU and parametric ReLU, but ultimately the best performance was achieved by tan h units. The size of the first hidden layer has a stronger effect on the model performance than other layers because it is responsible for mapping the information contained in 360000 sparse features to a much smaller dense feature space. Therefore, the automated predictive analytics system opts to make the input layer as large as possible within the memory constraints of the GPU hardware.

B. Sample Weighing

The automated predictive analytics system optimizes the model against a categorical cross-entropy loss function. However, the automated predictive analytics system ran into two obstacles that prevented the model from learning robustly. First, the training set contains a significantly imbalanced distribution of examples among the various classes. For example, the training set contains 49,932 companies labeled with NAICS code 541921—Photography Studios, Portrait, but only 116 companies labeled as 326220—Rubber and Plastic Hoses and Belting Manufacturing. Second, as described above, the labels for some of the classes in the training set are highly unreliable. The automated predictive analytics system addresses both of these obstacles with a scheme of differential inter- and intra-class weighting, through the use of class and sample weighting. The automated predictive analytics system weights each class according to the ratio of the total number of training examples to the number of training examples for that class. If there are C classes, N examples in the training set, and $N_C$ examples in a particular class, the weight for that particular class is set to $$\sqrt{\frac{N}{C * N_C}}$$

This weighting scheme up-weights the classes with fewer examples and down-weights the classes with more examples, so that the model learns robustly across all classes, rather than learning in a skewed fashion so that it only predicts into the most well-represented classes. There is some evidence that such an inter-class weighting schema also leads to a loss function that is robust to noisy labels in the training set [13]. However, the automated predictive analytics system also addresses the noisy label problem using intra-class weighting. For six-digit NAICS classes with particularly noisy labels, the automated predictive analytics system uses the HIT system to manually verify the labels for a small number of training examples (around 200). The system then up-weights the verified examples while down-weighting the unverified examples. If a particular class contains $N_C$ examples, V of which are verified and U of which are unverified, the weight for a verified example is:

$$\left(1 - \frac{1}{2^{V/100}}\right) * \frac{N_C}{V}$$

And the weight for an unverified example is:

$$\frac{1}{2^{V/100}} * \frac{N_C}{U}$$

In other words, for every 100 verified samples in a class, the automated predictive analytics system allocates half of the total remaining weight within the class to the verified samples, so that the verified samples account for 50% at 100 verified, 75% at 200 verified, 87.5% at 300 verified, and so forth. In case the direct portion of verified samples is higher than what the above allocation would prescribe, i.e. when $$\frac{V}{N_C} > 1 - \frac{1}{2^{V/100}}$$

the verified and unverified weights are both set to 1.0 since the verified samples already have the larger allocation based on portion. During training, the final sample weight is the multiplicative product of the class weight and the verified or unverified weighting within the class for verified and unverified samples, respectively. This weighting scheme allows the model to prioritize the verified examples in such a way that the model skews more heavily toward the verified examples as the number of verified examples increases, without affecting the distribution of inter-class weights.

C. Training

Recent research has shown that using large minibatches can speed up training with only minimal impact to optimization quality when used in conjunction with large learning rates and appropriate learning rate scheduling [10]. Training on minibatches of 1024 samples, the automated predictive analytics system updates the model parameters using an Adam optimizer with Nesterov momentum. The automated predictive analytics system sets the epoch size to 400,000 samples, thus covering the entire labeled dataset every 10 epochs. After each pass on the full dataset, the samples are shuffled before generating minibatches in the next pass. The reference learning rate is set to 0.008, but the automated predictive analytics system uses a gradual warmup starting from 0.001 and linearly increasing to 0.008 on the 5th epoch. On every 15th epoch, the automated predictive analytics system drops the base learning rate by a factor of 10, which helps to trigger further learning after optimization saturates at the previous base learning rate [12]. The training is run for a total of 55 epochs.

III. RESULTS

A. Baseline

There are two important metrics with which the automated predictive analytics system measures the ability of the model to successfully predict industry classifications. First, the automated predictive analytics system measures the ability of the model to predict the NAICS code for a given company. To do this, the automated predictive analytics system holds out a small portion of the labeled training set—around 200,000 examples—for testing. Second, however, since the provided labels are not always accurate, the automated predictive analytics system should independently measure the true accuracy of the model's predictions. To do this, the automated predictive analytics system uses the HIT system to assess the predictions that the model makes for unlabeled companies in the dataset. Because the HIT system relies on manual verification, the automated predictive analytics system is able to test only a small number of predictions.

For the first metric, the automated predictive analytics system establishes a benchmark for the success of the multilayer perceptron classifier using a simple naive Bayes model. The naive Bayes model largely fails to learn on the training set, achieving an overall accuracy of 4.7% across the test set. A useful measure of the success of a classifier is the F1 score, which is calculated as the harmonic mean of precision—i.e., the ratio of correctly labeled examples for a particular class to the total number of examples labeled by the model as belonging to that class—and recall—i.e., the ratio of correctly labeled examples to the total number of examples that actually belong to the class. F1 scores range from 0 to 1. The average F1 score across all classes for the naive Bayes model was just 0.069. The failure of the naive Bayes model demonstrates the challenging nature of the problem the automated predictive analytics system is attempting to solve.

For the second metric, the automated predictive analytics system establishes a benchmark using the purchased industry-standard database itself. Since the reliance on the HIT system prevents us from examining in detail the accuracy of the labels and the predictions of the model for all 1057 six-digit NAICS codes, the automated predictive analytics system chooses to focus on a small sample of 3 representative NAICS codes, chosen for their differing levels of difficulty: 445110—Supermarkets and Other Grocery (except Convenience) Stores, 524210—Insurance Agencies and Brokerages, and 541110—Offices of Lawyers. Our HIT system, which examined a random selection of 200 examples from each class, found that the vendor-provided labels are 42.0% accurate for grocery stores, 86.9% accurate for insurance agencies, and 92.1% accurate for lawyer's offices. The significantly lower accuracy for classifying NAICS code 445110 probably results from the fact that the data vendor labels many convenience stores and delis with this code, even though the NAICS taxonomy explicitly excludes entities of those natures from this particular industry code.

B. 6-Digit NAICS Classification

Evaluated against the labeled examples in the holdout test set, the overall accuracy of the multilayer perceptron model was 47.9%, with an average F1 score across all classes of 0.272. Importantly, these metrics are computed against noisy labels, and do not necessarily reflect the true accuracy of the model. While these numbers may seem low, they do demonstrate that the deep learning model dramatically outperforms the naive Bayes baseline, and from a practical point of view, it is able to assign potential labels to the other 80% of the database whose industry attribute is blank. Moreover, there is some reason to believe that the limiting factor is not the strength of the model, but the reliability of the data in the training set and the test set.

Figure 2:
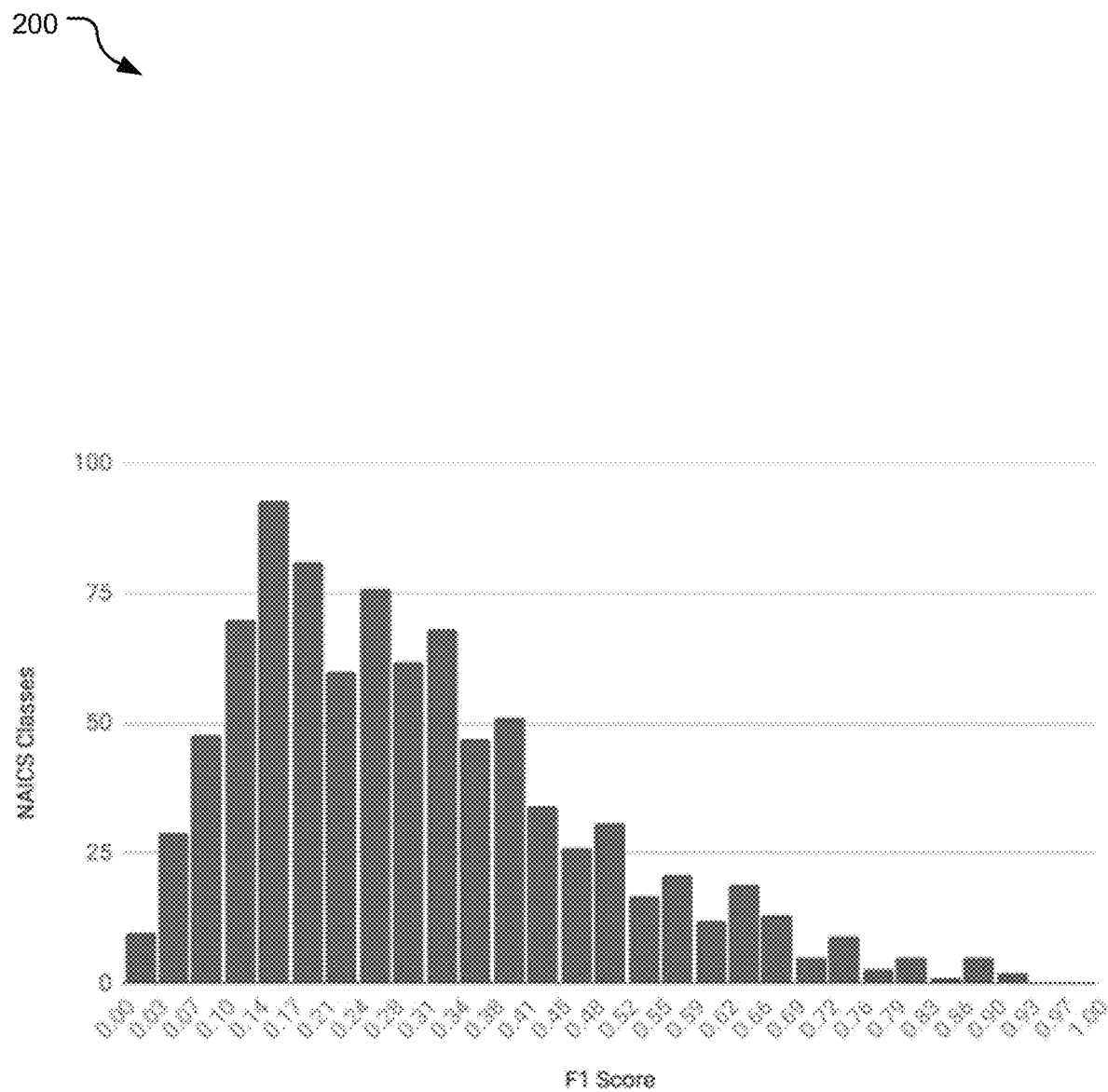
FIG. 2 illustrates an example plot of F1 scores for different classes. Specifically, it illustrates counts of six-digit NAICS classes within each F1 score range. While F1 scores for most classes are clustered around the average (0.27), there are many classes for which the model achieves significantly higher or lower scores. Importantly, these F1 scores are measured against noisy labels, and do not necessarily reflect the true accuracy of the model's predictions.
Figure 3:
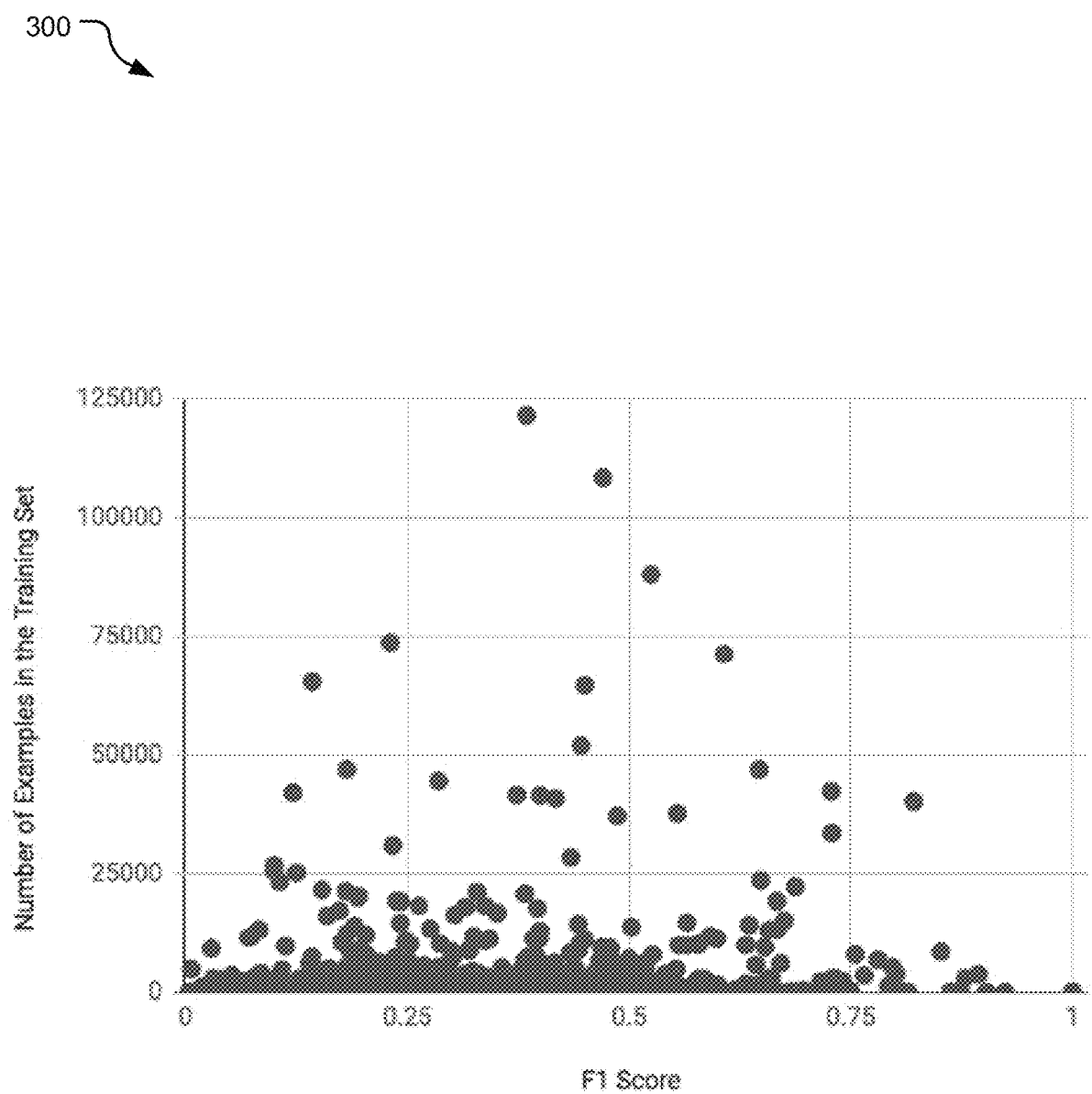
FIG. 3 illustrates an example plot of the number of examples in the training set for each NAICS code is plotted against the F1 score the model achieves for that code. F1 score does not seem to correlate with the size of the class, suggesting that the inter-class weighting scheme is working successfully.

On the NAICS codes for grocery stores, insurance agencies, and offices of lawyers, the model achieves an F1 score on the test set of, respectively, 0.383, 0.814, and 0.903. Interestingly, these results closely track the reliability of the vendor-provided labels for these NAICS codes. As can be seen in FIG. 2, the F1 scores 200 for different classes differ quite dramatically, although many are clustered around the average. The ability of the model to successfully predict into a class does not seem to depend on the representation of the class in the training set, suggesting that the inter-class weighting scheme is working as expected (see FIG. 3). The results of the model on the three classes for which the automated predictive analytics system assessed the label reliability suggest that F1 scores 300 may correlate with the quality of the training data for a particular class. However, a full analysis of the accuracy of the training labels for each class is necessary to determine whether the success of the model is constrained primarily by the reliability of the training set.

C. Confidence Scores

Figure 4:
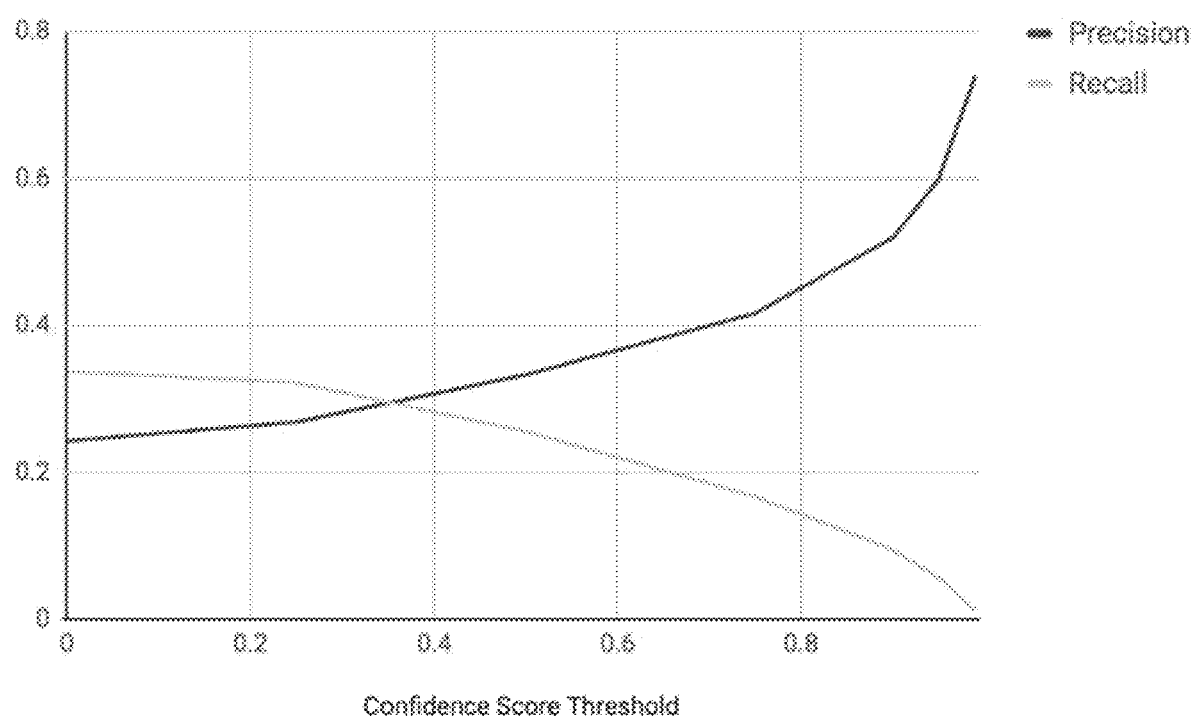
FIG. 4 illustrates an example plot of average precision and recall across NAICS classes as the confidence threshold is increased. These metrics are computed against noisy labels. As the automated predictive analytics system requires that the model have a confidence score close to 1 to predict into a class, precision increases dramatically. However, recall falls as the model predicts many companies into the null class.

The F1 scores reported in the previous section are determined based on the six-digit NAICS code predicted by the model for each example in the test set. The predicted code corresponds to the class with the highest activation score after the outputs of the neural network are fed through the softmax layer. By thresholding the predictions of the model based on this activation score, which is always between 0 and 1, the automated predictive analytics system can ensure that the model only predicts into a class when it is "confident" that the example belongs to that class. This technique allows us to dramatically increase the precision of the model's predictions, albeit at the cost of sacrificing recall (see 400, FIG. 4).

D. Comparing Precision Against the Industry Standard

Figure 5:
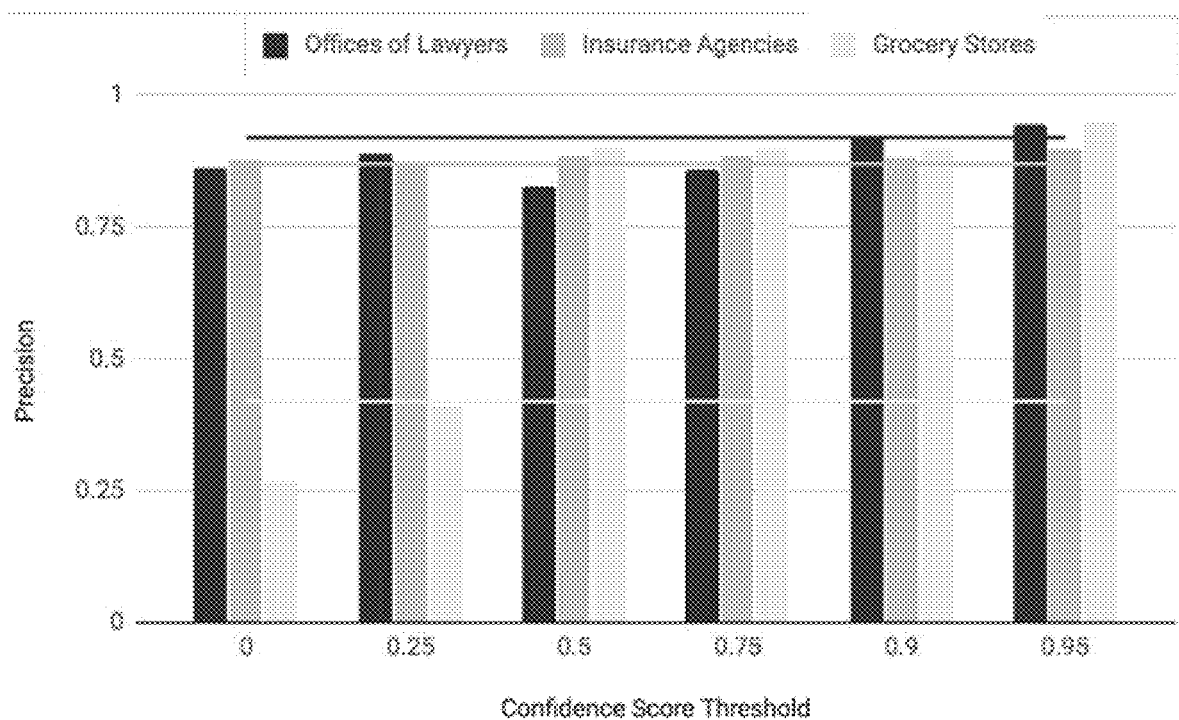
FIG. 5 illustrates an example plot of HIT-verified precision on three classes as confidence threshold increases. Horizontal lines represent the precision of the vendor-provided labels for each class. Raising the threshold allows the model to surpass the precision of the labels on all three classes. Unlike the metrics in the previous figure, these precision scores are verified independently of the noisy labels, and reflect the true accuracy of the model.

Importantly, the results reported in the previous two sections were gathered by evaluating the model's predictions on the labeled examples in the test set. Since the labels are highly unreliable, these results reflect only the capacity of the model to reproduce the patterns inherent to the labeled dataset, and not necessarily its capacity to accurately predict NAICS codes. In order to evaluate the true power of the model as a six-digit NAICS code industry classifier, the automated predictive analytics system used the HIT system to evaluate the model's predictions for grocery stores, insurance agencies, and offices of lawyers. The automated predictive analytics system generated these results by collecting around 1500 examples—from the unlabeled segment of the dataset—that the model had predicted into each class. The automated predictive analytics system then used the HIT system to determine how many of these examples actually belonged to the NAICS industries that the model had classified them into. Consequently, the automated predictive analytics system is able to evaluate only the precision of the model's predictions for these classes, and not the recall. As can be seen in FIG. 5, the raw predictions 500 of the model have a precision comparable or somewhat inferior to that of the labels purchased from the industry-standard vendor. However, once the automated predictive analytics system thresholds based on confidence score, the model produces predictions that exceed the training labels in precision. For the grocery stores class, on which the labels were highly unreliable, the confidence-score-thresholded predictions are able to dramatically improve upon the precision of the labels. Interestingly, the relationships between precision and confidence score threshold differ dramatically across these three classes. The automated predictive analytics system found that the majority of the model's predictions for insurance agencies and offices of lawyers were made with confidence greater than 0.5, while only 30% of the predictions for grocery stores were made with this level of confidence. This explains why applying a confidence score threshold improved the precision for grocery store predictions more than for the other two classes. These data suggest that the model is able to learn to make more confident predictions when presented with more reliable training data.

E. Evaluating Recall

Figure 6:
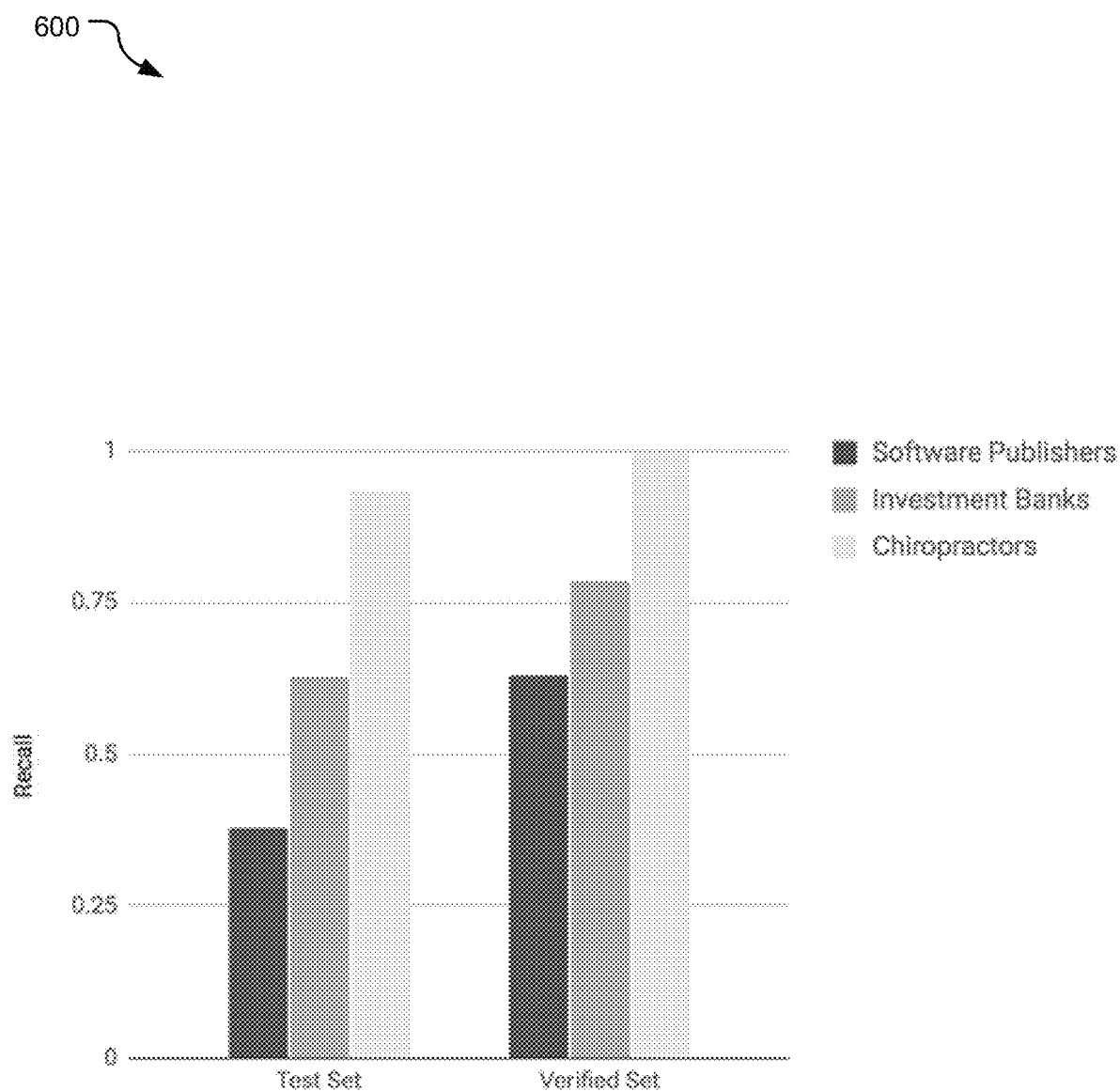
FIG. 6 illustrates an example plot of overall recall on the test set and recall on a set of verified examples. On all three classes, the model achieves a higher recall on the verified set. This suggests that, despite the noise in the labels, the model is learning to respond to patterns that are associated with true NAICS codes.

Our first experiment with the HIT system demonstrated that, with confidence thresholding, the true precision of the model's predictions—as opposed to the precision measured against the noisy labels—can exceed the precision of the labels in the original dataset. The automated predictive analytics system took a similar approach to investigate the true recall of the model's predictions. In this second experiment, the automated predictive analytics system chooses three NAICS codes, again intended to represent classes with varying degrees of classification difficulty: 511210—Software Publishers, 523110—Investment Banking and Securities Dealing, and 621310—Offices of Chiropractors. For each class, the automated predictive analytics system used the HIT system to identify around 200 examples in the test set that corresponded to companies that really belonged to the NAICS code with which they had been labeled. The automated predictive analytics system then compared the recall of the model on all examples in the test set labeled with each code to the recall of the model on only the verified examples. As shown in FIG. 6, the automated predictive analytics system found that the model has substantially better recall on the verified examples, across all three classes as shown by 600. This suggests that, despite the noise present in the labels in the training set, the model was able to respond to underlying patterns in the data corresponding to real differences between the NAICS code classes.

F. Skewed weighting for Verified Samples

Figure 7:
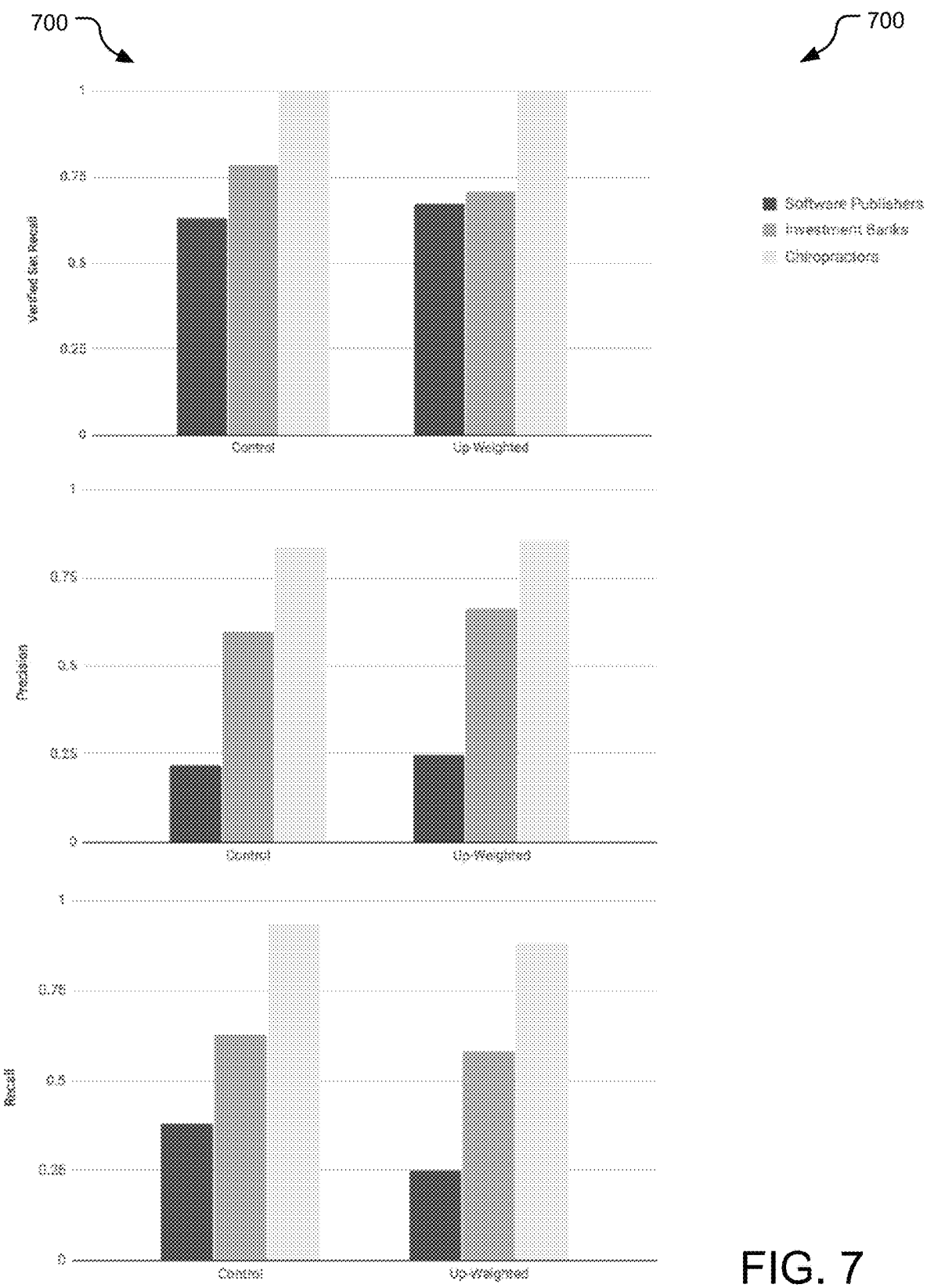
FIG. 7 illustrates an example plot of Precision (bottom left), recall (bottom right), and verified set recall (top), with and without up-weighting of verified examples in the training set. Specifically, up-weighting verified examples in the training set has a similar effect to increasing the confidence score threshold, increasing precision at the cost of recall. The effect on recall of the verified examples in the test set is unclear.

In Section II-B, the automated predictive analytics system used a method of utilizing verified samples in the training set and up-weighting these examples so that, as the model learned, it would skew towards the confirmed training examples. This third experiment yielded mixed results. For each of the three classes the automated predictive analytics system focused on, the automated predictive analytics system employed around 100 up-weighted verified examples in the training set, and the automated predictive analytics system kept around 100 verified examples in the test set. FIG. 7 shows precision and recall measurements 700 for models trained with and without skewed weighting for verified samples, against the noisy and verified label sets. Skewing training towards the verified examples slightly increased precision and slightly decreased recall for all three classes when measuring against the noisy labels. This makes sense because noisy labels may contain systematic false positives which would not be identified after training is skewed towards verified labels. This method did not seem to substantially increase the recall of the model on the verified samples in the test set.

G. LinkedIn Industry Classification

Figure 8:
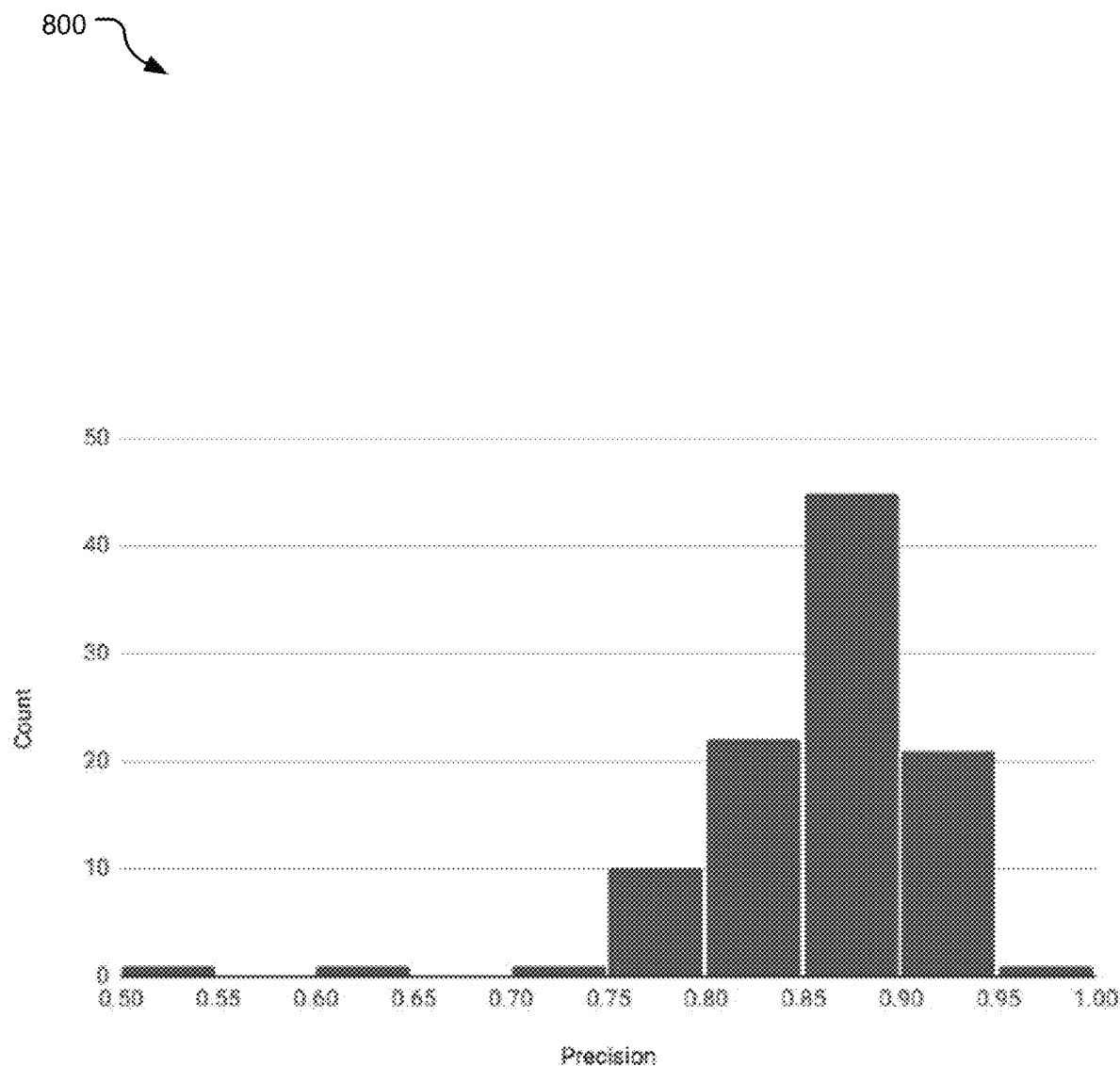
FIG. 8 illustrates an example plot of distribution of precision over LinkedIn industries. For the majority of LinkedIn industries, the model makes predictions with a precision of at least 80%.

In addition to assessing the model's ability to predict six-digit NAICS codes, the technology disclosed herein evaluates the capacity of the architecture to adapt to other industry classification schemas. For this experiment, an implementation uses the same dataset as for the NAICS classification. However, rather than labeling the examples in the training set using NAICS codes from the dataset purchased from a vendor, an implementation uses LinkedIn industry codes, taken from the companies' LinkedIn pages. Since there are only 147 LinkedIn industry codes, in contrast to the 1057 six-digit NAICS codes, and since the codes on company LinkedIn pages are largely self-reported and tend to be highly reliable, LinkedIn industry classification is a far simpler task than six-digit NAICS classification. Evaluating the disclosed model's predictions using the HIT system, it is found that the disclosed model classifies companies into LinkedIn industries with an overall precision of 86%. The model classifies the vast majority of industries with a precision greater than 80%, and the lowest precision for the model's predictions on any class is 52%. The distribution of precision scores 800 for the different classes is shown in FIG. 8.

IV APPLICATIONS

The technology discloses two primary applications for the model disclosed herein. First, the model holds potential as a tool for the segmentation of the U.S. economy into industries. Such a usage may be of interest to investment banks hoping to understand the economic landscape, or even to federal statistical agencies. There are still challenges to accomplishing this task since the model is limited by the reliability of available training data, and even for humans the task of classifying into nuanced six-digit NAICS codes is difficult for many codes which require deep domain knowledge and training. However, for any entity satisfied with a breakdown of the economy into around 150 industries, the model offers a robust and efficient means for industry segmentation. The disclosed model predicts LinkedIn industry codes with a high degree of precision, and offers a powerful and scalable means of accurately segmenting the U.S. economy.

Second, the disclosed model is a powerful and useful tool for any entity that seeks to identify companies that belong to a specified industry. By thresholding the model's predictions based on confidence score, the disclosed technology is able to precisely predict six-digit NAICS codes, even for difficult-to-classify industries. Of course, thresholding based on confidence score sacrifices recall. However, for entities that are interested in identifying a set of companies within an industry, rather than mapping the industry distributions of all companies in the economy, this loss of recall does not pose a problem. Sales or marketing teams looking to generate new leads, insurance agencies seeking new clients, and venture capital firms in search of new investment prospects stand to take advantage of the model's ability to predict six-digit NAICS codes with a high degree of precision, after the application of confidence thresholding. For many such use cases, precision is far more important than recall, and the precision of the model exceeds that of the gold-standard databases.

V. CONCLUSION

The disclosed technology demonstrates a model framework for industry classification which can learn from imperfect labels but also utilize and mix in verified examples as they become available. With tunable confidence thresholding, precision can be increased even beyond the precision of the noisy labels it was trained with, and at a modest cost in recall. Coupled with automated and periodic crawling and feature extraction directly from company websites, the approach to industry classification promises efficiency, scalability, and adaptability. These qualities make such an approach far more preferable to the traditional industry classification databases, which rely on slower and less adaptive methods. Moreover, the examinations of the vendor-supplied data suggest that even the gold-standard databases of NAICS industry classifications suffer from unreliability resulting from ambiguity in the NAICS taxonomy and human error.

In order to create a machine-learning-driven industry classifier capable of performing full industry segmentation with a level of reliability higher than that of the benchmark databases, more work will have to be done to create clean training sets. However, even with unreliable training sets, thresholding based on confidence score yields a model capable of predicting six-digit NAICS codes with precision that significantly exceeds that of the benchmark databases. For entities interested in identifying novel companies that belong to particular industries, for whom the precision of these identifications is critical, the approach to industry classification disclosed herein improves upon the gold-standard.

Figure 9:
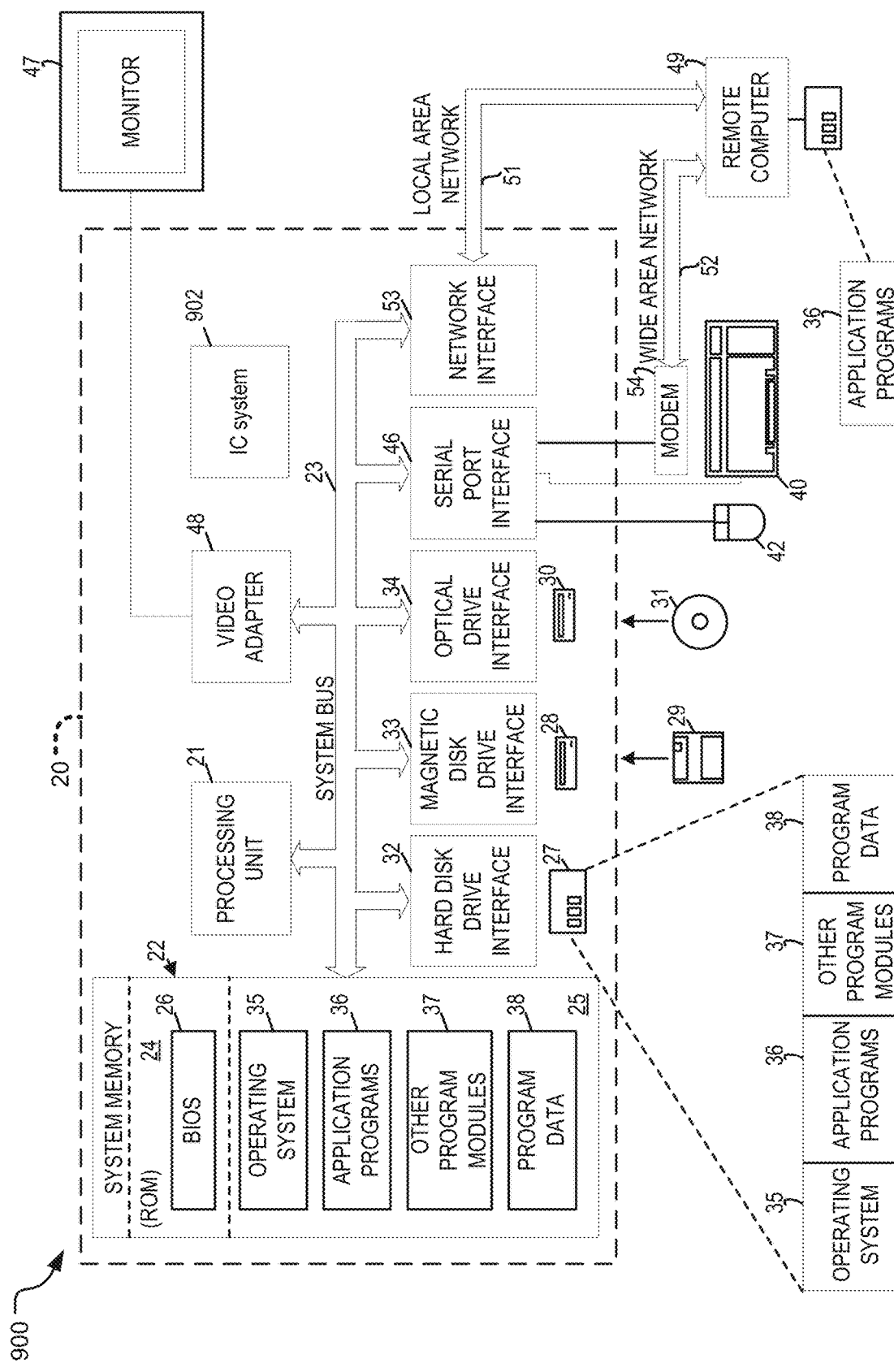
FIG. 9 illustrates an example computing system that may be used to implement the technology disclosed herein.

FIG. 9 illustrates an example system 900 that may be useful in implementing the described predictive analytics technology. The example hardware and operating environment of FIG. 9 for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the automated industry classification system 902 as disclosed herein may be implemented in one of the memories of the computer 20.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object-oriented databases, relational databases, SQL databases, audit trails and logs, program memory, cache and buffers, and the like.

Figure 10:
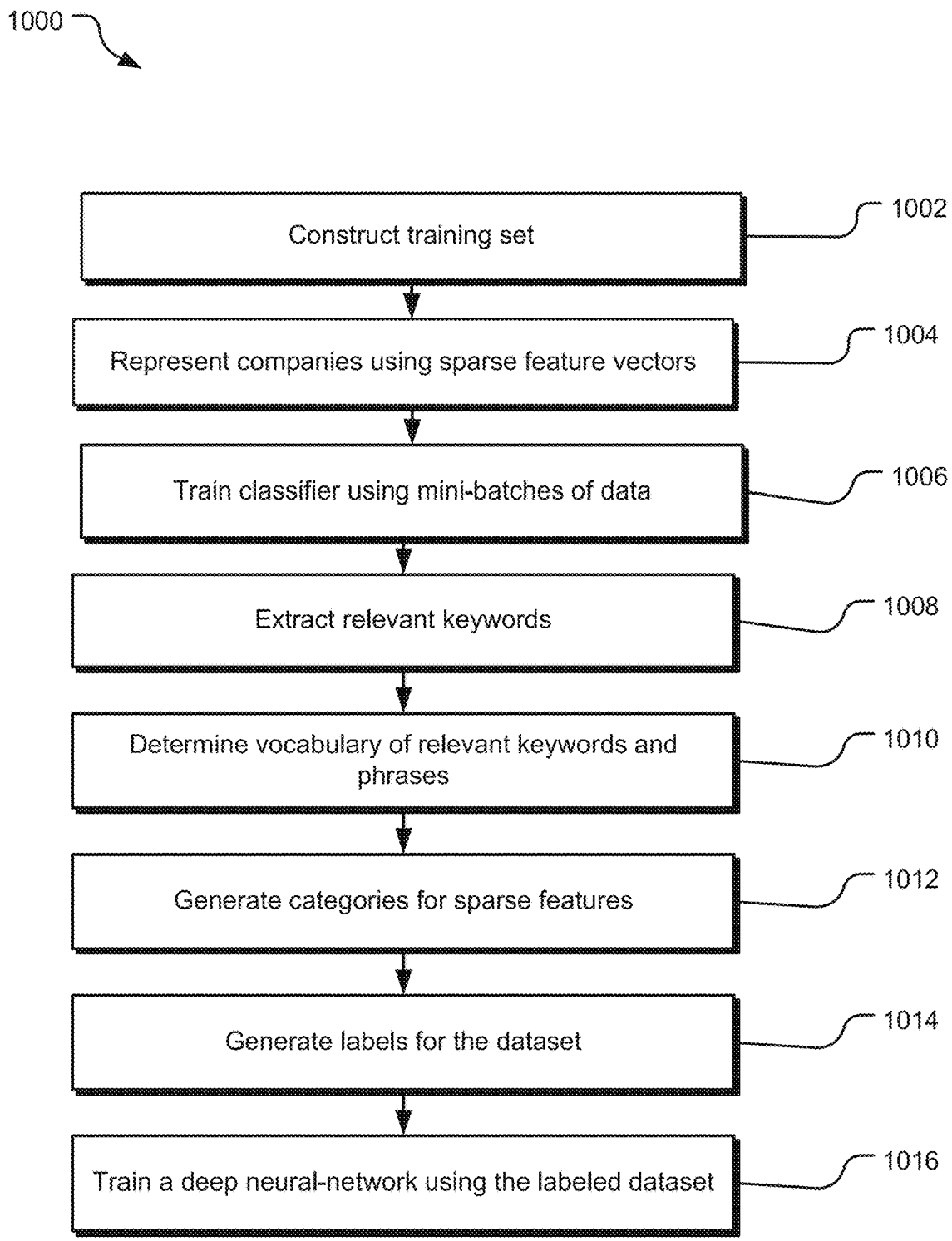
FIG. 10 illustrates example operations for implementing the automated industry classification system disclosed herein

FIG. 10 illustrates operations 1000 for implementing the automated industry classification system disclosed herein. An operation 1002 constructs a training dataset of using a database, wherein the database includes an index tying a plurality of companies with a set of attributes. An operation 1004 represents the plurality of companies using sparse feature vectors. An operation 1006 trains a classifier on mini batches of data from the dataset. An operation 1008 extracts relevant keywords for one or more of the plurality of companies from one or more of webpages, titles, meta descriptions, meta keywords, hyperlinks, and visible text. An operation 1010 determines a vocabulary of keywords and keyword phrases relevant in describing the services and product offerings of one or more of the plurality of companies. An operation 1012 generates categories for sparse features of the dataset. An operation 1014 generates labels for the plurality of companies in the dataset. Subsequently, an operation 1016 trains a deep neural-network model using the labeled dataset.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of generating industry classifications, the method comprising:
constructing a training dataset of using a database, wherein the database includes an index tying a plurality of companies with a set of attributes;
representing the plurality of companies using sparse feature vectors;
training a classifier on mini batches of data from the dataset;
extracting relevant keywords or keyword phrases for one or more of the plurality of companies from one or more of webpages, titles, meta descriptions, meta keywords, hyperlinks, and visible text;
determining a vocabulary of keywords and keyword phrases relevant in describing the services and product offerings of one or more of the plurality of companies;
generating categories for sparse features of the dataset;
generating labels for the plurality of companies in the dataset; and
training a neural-network model using the labeled dataset.

2. The method of claim 1, further comprising performing natural language processing on the one or more of the webpages, titles, meta descriptions, meta keywords, hyperlinks, and visible text to extract relevant keywords.

3. The method of claim 1, further comprising web crawling internet data to acquire the one or more of the webpages, titles, meta descriptions, meta keywords, hyperlinks, and visible text.

4. The method of claim 1, further comprising determining a frequency at which each keyword or keyword phrase appears within the one of more of the webpages, titles, meta descriptions, meta keywords, hyperlinks, and visible text.

5. The method of claim 4, further comprising performing a bag-of-words analysis on the keyword or keyword phrases to determine the frequency of each keyword or keyword phrase.

6. The method of claim 1, wherein the training dataset includes a weight for each class based on a ratio of a total number of training examples to a number of training examples for that class.

7. The method of claim 6, wherein the weight causes the training examples of one class to be up-weighted.

8. The method of claim 6, wherein the weight causes the training examples of one to be down-weighted.

9. The method of claim 6, wherein the weight is also based on verified and unverified training examples.

10. The method of claim 9, further comprising up-weighting the verified training examples.

11. The method of claim 10, further comprising down-weighting the unverified training examples.

12. The method of claim 1, further comprising updating parameters of the neural-network model with an Adam optimizer with Nesterov momentum.

13. The method of claim 1, further comprising:
inputting a second dataset associated with a company into the neural-network model; and causing the neural-network model to output a classification code associated with the company based on the second dataset.

14. The method of claim 13, wherein the neural-network model generates a confidence score for the classification code based on the second dataset.

15. The method of claim 14, further comprising thresholding the confidence score to remove the classification code when the confidence score is below a given value.

16. The method of claim 1, further comprising generating a term frequency inverse document frequency (tf-idf) value, the tf-idf value being a ratio of a frequency with which the keywords and keyword phrases occur in a document or collected information about the one or more companies to a frequency with which the keywords and keyword phrases occur in a plurality of documents or collected information about the one or more companies.

17. The method of claim 16, wherein one of the sparse features is the tf-idf value calculated from a pooled set of texts across all sources for the one or more companies.

18. The method of claim 16, wherein one of the sparse features is the tf-idf value calculated from homepage title, meta description, meta keywords, or combinations thereof associated with the one or more companies.

19. The method of claim 16, wherein one of the sparse features is the tf-idf value calculated from a homepage hyperlink associated with the one or more companies.

* * * * *